July 18, 1939.　　　　K. JAGSCHITZ　　　　2,166,156
DRY GAS HOLDER
Filed March 11, 1935　　　4 Sheets-Sheet 1

INVENTOR.
KONRAD JAGSCHITZ
BY
ATTORNEY.

INVENTOR.
KONRAD JAGSCHITZ
BY
ATTORNEY.

July 18, 1939.  K. JAGSCHITZ  2,166,156
DRY GAS HOLDER
Filed March 11, 1935   4 Sheets-Sheet 3

INVENTOR.
KONRAD JAGSCHITZ
BY
ATTORNEY.

July 18, 1939.　　　K. JAGSCHITZ　　　2,166,156
DRY GAS HOLDER
Filed March 11, 1935　　　4 Sheets-Sheet 4

INVENTOR.
KONRAD JAGSCHITZ
BY
ATTORNEY.

Patented July 18, 1939

2,166,156

UNITED STATES PATENT OFFICE 2,166,156

DRY GAS HOLDER

Konrad Jagschitz, Mainz, Germany, assignor to Maschinenfabrik Augsburg-Nuernberg A. G., Nuremberg, Germany, a corporation of Germany Application March 11, 1935, Serial No. 10,533
In Germany March 13, 1934

24 Claims. (Cl. 48—178)

The present invention relates to gasholders, particularly of the dry type, and has for its general object to provide a simple and practicable gasholder of bellows- or accordion-like configuration whereby the sliding seal now generally employed in dry gasholders is eliminated. According to the present mention the gasholder is provided with an undulated or corrugated shell which is elastic, the individual superposed sheet-metal rings forming the shell being bendable in such a manner that they are able to increase and to decrease in length and/or breadth under the action of the tensions arising when the holder is being filled or emptied. In one constructional form of said gasholder the distance between the inner and the outer diameter of the undulated or corrugated shell is occupied by only one undulation or wave the crest and trough running approximately concentrically to the central vertical axis of the gasholder, there alternating rigid parts with elastic parts, as is fully described hereinafter. In a further modified construction contemplated by the present invention, there is associated with the undulated shell a liquid-filled basin located at the bottom of the gasholder and receiving in the liquid the shell portions when they are collapsed. The invention comprises, besides the above-mentioned chief characteristic features, a plurality of subsidiary characteristic features, which are all fully described hereinafter.

As already indicated, the gasholder to which the present invention relates is of the dry type in which no sliding friction whatever exists against the inner wall of the shell. Gasholders which comprise a top member or roof, a bottom member, and a bellows-like shell which connects said top and said bottom with each other, have already been proposed, and it has also been suggested to make said shell of sheet-metal rings connected with one another alternately at the outer and inner rims in gas-tight relation, for instance by welding. In these known gasholders the expansible bellows-shaped portion consists of plain sheet-metal members which entails the application of a very considerable force to obtain the necessary changes in the shape of the bellows-shaped shell when the latter is expanded. Moreover, these large changes in the shape of the sheet-metal rings caused by correspondingly large stresses during the filling and emptying of the gasholder ultimately produce overstrain and fatigue in the metal, the rings then losing their elasticity and the change in shape becoming permanent.

Those drawbacks are obviated in and by my present invention, and I attain the object in view by making use of undulated sheet-metal plates for producing the bellows-like shell of the gasholder, these plates presenting only a slight resistance against the changes of shape arising when the holder is filled or emptied.

In a gasholder shell of the type above described the gas pressure acts upon the concave side of the sheet-metal undulations or corrugations and there arise; owing thereto, forces which are directed outwardly at the inner rim of the shell and inwardly at the outer rim of the same. The vaulted sheet-metal is subjected to tensile stress and endeavors to bend more strongly under the action of the gas pressure. To obviate this tendency to bend, separate supporting rings may be provided, but such result may be attained also in other ways without the aid of said separate rings, as described hereinbelow.

With the bellows-like gasholders of the present invention there may be employed cleaning and heating devices of any suitable kind. Corrosion takes place at the inner surfaces of gasholders due to the formation of a mixture of condensed vapor and certain component substances separating from out of the gas. It is important to render this mixture innoxious, and for this purpose the bottom of the gasholders designed according to the present invention are provided with a cleaning device and, if desired, also with a heating device, this latter device being likewise employed when the gasholder has a central guide column.

The invention is illustrated diagrammatically and by way of example on the accompanying drawings on which

Figure 10:
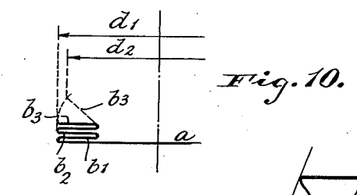
Figure 10 is a transverse section through a portion of a gasholder of known type.

In order that my invention may be more readily understood, I refer first to Figure 10 in which $a$ denotes the bottom of the gasholders and $b1$, $b2$ are annular sheet-metal disks that form the bellows-like shell of the gasholder. The top plate or cover or roof of the gasholder has been omitted in this figure because it is not necessary for a proper understanding of the invention. When the gasholder is being filled with gas it would be necessary, for instance, for the annular disk $b3$ to assume the inclined position $b3'$ shown in dotted lines, but then the outer diameter of said disk must be reduced from $d1$ to $d2$, which is technically impossible.

The deficiencies from which the proposals hitherto made suffer are obviated in the present invention in which the bellows-like shell is composed of bent or undulated or corrugated sheet-metal rings which are bendable in such a measure or degree that they can increase in length under the action of the forces present when the gasholder is being filled or emptied.

The new gasholder consists, therefore, of a bottom, a top member or roof, and individual annular sheet-metal sections, or rings. These sections or rings are located above one another, and are connected with one another alternately at their adjacent outer and inner rims. These connections are articulated so that the rings can be drawn away from one another. When the gasholder is in emptied state, the rings lie above one another in an approximately horizontal position, but when the holder is being filled, the rings assume an oblique position with respect to, and their inclinations alternate with, one another, each ring representing the surface of a hollow truncated cone. This change of the shape is rendered possible without any material consumption of power by the undulations of the sheet-metal. The undulations or corrugations may extend circumferentially or more or less radially, and their length may be chosen as desired, and may be so that two adjacent rings form one wave, the entire shell resembling then an undulated tube, the undulations of which are very large. The articulated connection at the outer and at the inner rims of the rings can be formed by hinges and hinge bolts or by elastic intermediate members.

The new gasholder may be provided with a central guide tube of known type, but the gasholder is, nevertheless, stiff enough in itself so that a guide tube can be dispensed with. It is, however, in this case practical to provide at the rim of the top plate or roof guide bars or the like which extend downwardly for such a distance that their lower ends touch the ground when the holder is in the empty state.

In plan, the new gasholder may have a circular or a polygonal shape, as desired.

Figure 1:
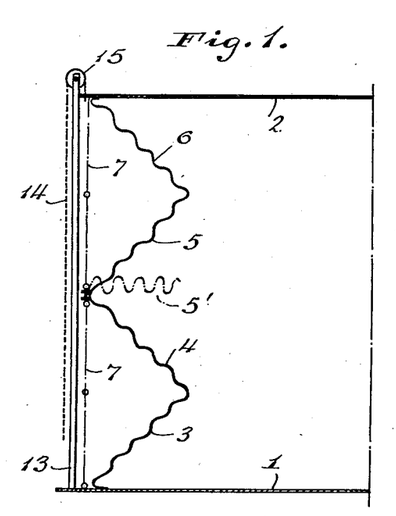
Figure 1 is a vertical section through the left-hand half of a gasholder, or gasholder shell, designed according to this invention the crests and troughs of the undulations of the several superposed sections of the shell (4 in this case) extending horizontally.

Referring now to Figure 1, $1$ denotes the bottom, $2$ the top or roof, and $3$, $4$, $5$ and $6$ the shell, that is to say, the shell consists in this case of four rings having more or less horizontally or radially extending undulations, which are, thus, concentrical with respect to one another, as well as to the axis of the gasholder. The rings are jointed to one another at their outer and at their inner rims, either by these rims themselves or by separate elastic sheet-metal strips. In Figure 1 the shell is shown in expanded state. When the holder is emptied, the rings collapse, assume an approximately horizontal position, and become arranged one above the other, the collapsed contracted condition of the rings being illustrated in dotted lines at $5'$ for purposes of comparison (the rings being of course nearer to the bottom of the gasholder in the collapsed condition of the gasholder). At their outer and at their inner circumference the rings are not substantially altered in any way, whereas the shape of the undulations changes; they become flatter or deeper as the gasholder expands or contracts, respectively, and at the same time the radial length becomes longer or shorter. The outer edges of the united rings are guided vertically while the movements and said changes take place. Said outer edges are, besides, connected with one another by foldable or otherwise yielding members $7$ which prevent the expansion of the shell beyond a predetermined height, and said members $7$ serve at the same time for stopping the top member or roof $2$ when the predetermined height has been reached.

Figure 2:
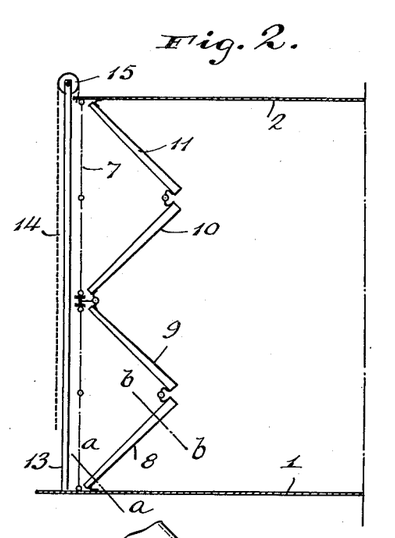
Figure 2 is a similar representation, the crests and troughs of the undulations extending, however, vertically or more precisely, obliquely.
Figures 2A, 2B, 3, 4, 5:
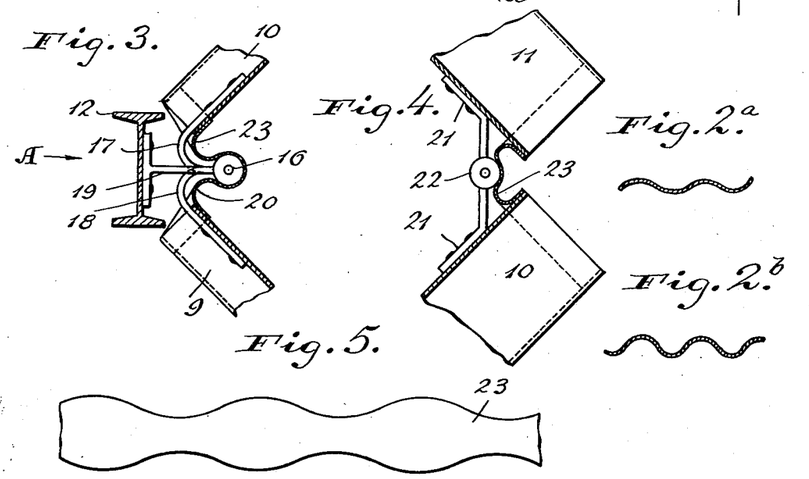
Figs. 2a and 2b are sections along the lines a—a and b—b of Fig. 2.
Figure 3, which is drawn to an enlarged scale, shows the connecting means between two adjacent outer edges of the shell sections shown in Fig. 2.
Figure 4 is a similar representation and shows the connecting means at the adjacent inner rims of said shell sections.
Figure 5 is a portion, shown in flat state, of one of the members of Figure 4.

In the modification shown in Figure 2 the undulations of the shell portions or rings $8$, $9$, $10$ and $11$ extend circumferentially, the rings as a whole extending in alternating oblique directions. The undulations of each ring become broader and at the same time flatter in outward direction, as is shown in the subsidiary Figures $2a$ and $2b$ the crests and troughs extending approximately along lines cut by planes passing through the central vertical axis of the gasholder. Motion-limiting members like $7$ (Figure 1) may be used also in connection with the constructional form illustrated in Figure 2, and the outer edges of the united rings are likewise vertically guided, as in Figure 1, and there may be provided at these edges stiffening girders $12$ (Figure 3). In this modification the individual rings are increased and decreased in length and in the circumferential direction at that ring edge which gives way in horizontal direction during the movement, the undulations extending in this direction undergoing likewise a change of their length and their height at that rim of the rings which increases or decreases in length, whereas at the other the height and the length of the undulations are not changed. Also the undulations of those portions of the rings which lie between said edges are changed as regards their height and their length, but in a decreasing degree. The greatest changes in the undulations take place at that edge which gives way horizontally, and those changes decrease continually to the other edge which is vertically guided. The annular girders $12$ here provided may be employed, slightly modified, also in connection with the shell shown in Figure 1.

In Figures 1 and 2 there is provided a guide frame or structure $13$ supporting rolls $15$ over which are passed chains $14$ attached, for example, to the roof and serving as counterpoises. The load on the roof or top $2$, as constituted by the weight of the lifted shell, becomes the greater, the higher said top has been lifted, and in correspondence therewith increases the action of the counterpoises. The action is greatest when the top is in highest position. When the top sinks, the load constituted by the shell decreases, and the balancing action of the counterpoises, or the chains respectively, decreases accordingly.

In Fig. 3 is shown the connection of the undulated or corrugated rings at their outer edges and in Fig. 4 is shown the connection of said rings at their inner edges. 9 and 10 denote the rims which are connected by hinge halves 17 and 18 connected in turn with one another by bolts 16. The hinges are, furthermore, connected with the horizontal girders 12 by T-irons 19. 20 are sealing or sealing sheet-metal strips which surround or enclose the hinge bolts 16 and are then bent upwardly and downwardly where they are connected with the rims 9 and 10 of the associated sections or undulated rings. The rims of the strips are undulated in order to fit to the undulations of the shell rings. The strips are preferably made of a particularly high-grade material to withstand continual bending without cracking. In Fig. 5 the strip is shown seen in the direction of the arrow A, Fig. 3, the girder 12 and the T-iron 19 being omitted.

In Fig. 4 is shown the connection of the undulated rings at their inner edges, the rings being shown at 10 and 11. As in Fig. 3, the connection is effected by hinge halves 21 and hinge bolts 22, and there are provided sealing or sheet-metal strips 23, shaped similarly to that shown in Fig. 5.

The length of the shell rings may be chosen within wide limits. In the constructional form shown in Fig. 6 the length of the undulations is such that two shell rings together, for instance 24 and 25 or 26 and 27, form one wave. To obtain as resistance-free an operation of the shell construction as possible, it is important, with the arrangements shown in Figs. 1 and 6, that is, with concentric waves or undulations, that the individual points of each wave or every undulation be moved always as nearly vertically as possible when the shell portions are lifted or lowered, and that the lateral displacements be kept within as narrow limits as possible. These lateral displacements mean additional forces when the top is lifted and lowered, as well as additional strains or stresses in the material, which may become very perceptible even at comparatively slight lateral displacements.

Figure 6:
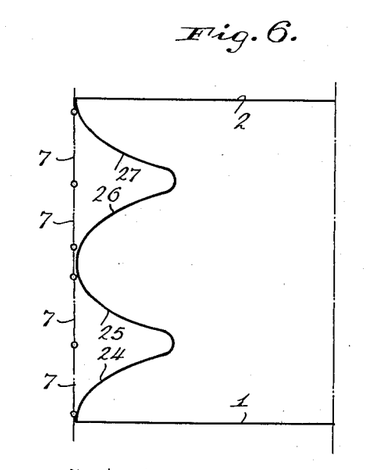
Figures 6, 7, 8 and 9 show four more modifications of the undulated shell.
Figure 7:
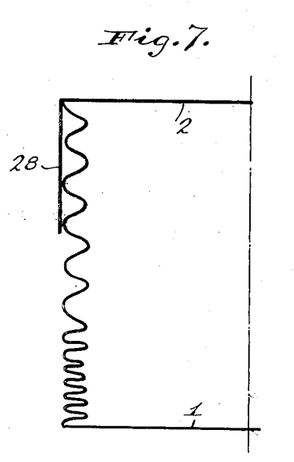

The constructional form shown in Fig. 7 is practically the same as in Fig. 6 except that the undulations are more numerous. The undulations are drawn to a reduced scale relatively to Fig. 6, and the shell is shown partly filled with gas. The shell is composed of 24 rings, of which about one half are still collapsed and the other half are already expanded. From the rim of the top 2 extend downwardly a plurality of rods 28, the length of which is such that they contact with the ground when the gasholder has become completely empty. Said rods serve at the same time as guides for the undulated sheet-metal shell portions; they may be stiffened with respect to one another by diagonal braces or the like.

The improved gasholder designed according to this invention is intended, first of all, as a dry gasholder, but it may also be designed in such a manner that the connection between the inner and the outer shell ring rims, as well as the connection between these rings on the one hand and the top and the bottom on the other hand, is effected by liquid-filled basins. It can be seen from Fig. 7 that there will exist a rather large dead space when the gasholder is in completely depressed condition. It is, however, possible to obviate such a space by filling it up by means of insertions made of concrete or masonry or an iron structure or even earth may be used. On the other hand, said space may be utilized by providing in it a receptacle for ammonia-water or other by-products etc.

Figure 8:
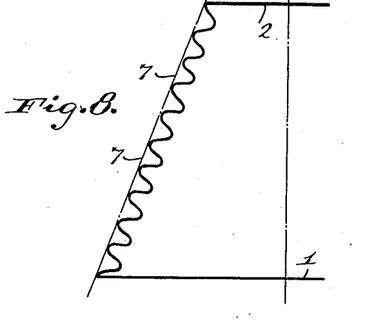
Figure 9:
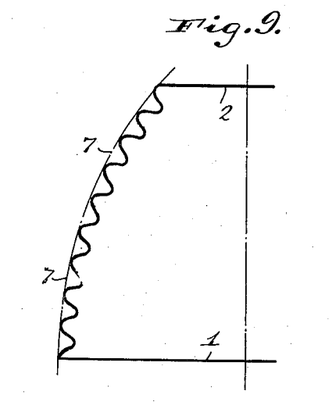

In order to prevent the difference in the pressure of the gas in the filled and in the empty state of the gasholder from becoming too great, constructional forms such as shown in Figs. 8 and 9 may be employed. In these constructions the diameter of the top 2 is smaller than that of the bottom 1 whereby the result is attained that the pressure due to the load constituted by the top is smaller in proportion to the smaller diameter of the same. When the top is in its lowermost position the desired gas pressure is produced solely by the smaller top 2, and when this latter is lifted the load and with it the gas pressure is increased by an amount corresponding to the lifted portion of the shell. Simultaneously therewith, however, the contour surface of the top upon which the gas pressure acts has been increased by the contour surface of the lifted shell portion so that the same specific gas pressure as before is sufficient to carry the top together with the lifted shell portion suspended from it. It is in this way rendered possible to compensate in a large measure for the action which the shell weight exerts upon the gas pressure by a suitable inclination of the shell.

In the constructional form illustrated in Fig. 9 this advantage is combined with an increase of the volume of the gasholder without any considerable increase of the amount of material requisite for building the gasholder. The bottom and the top have in Fig. 9 the same diameter as they have in Fig. 8, and the amount of building material is practically the same in both cases, there being only that slight difference as is conditioned by the slight difference in shape of the shells, the one (Fig. 8) being a truncated cone and the other (Fig. 9) being a truncated calotte or arched zone. But the volume of the holder is larger by as much as corresponds to the difference between the chord and the curve of the area enclosed, multiplied by the path of its point of gravity. Thus, a considerable enlargement of the volume of the gasholder is obtained with a minimum increase of material.

The two forms illustrated in Figs. 8 and 9 present also the advantage that the area of the top 2 is considerably decreased. Apart from the reduction of the amount of material requisite for making the top, the further advantage is attained that the eccentric loads acting upon the top, as, for instance, a one-sided snow-load, are considerably smaller. Owing to the small diameter of the top, the moment arms of the one-sided loads become shorter in the same proportion and no special guide frame need be provided whereby another advantage is obtained. The shape of the undulations or corrugations is so chosen that rain and water of condensation can easily flow down, and if this cannot be attained in any particular case it is not difficult to provide a separate overflow.

Having now described the first section or portion of the present invention I proceed to deal with the second.

When the shell of the gasholder is so constructed that only a single radial wave of the individual rings spans the distance between its outer and inner diameters, as is shown, for example, in Fig. 6, the gas pressure acting from the interior, that is, upon the concave side of the sheet metal ring, seeks to arch the ring more strongly toward the exterior. The edges of the sheet metal ring thus strive to approach each other, that is, the inner edge tends to move outwardly and the outer edge inwardly. This could, of course, be prevented by providing annular stiffening members at the edge connections of the sheet metal rings, such as shown, for example, in Fig. 3 in the form of ring 12, and as can be seen in Fig. 1 in combination with the outer edges of the sheet metal rings 4, 5. The present invention, however, provides a method of preventing the movement of the edges in a shell having only single-wave rings while dispensing with such stiffening rings and at the same time securing still other advantages.

In contradistinction to designing the gasholder shell in the manner illustrated in Figs. 1 and 2 and in Figs. 6—9, I compose the shell of alternating rigid and elastic rings, the rigid ones constituting the lateral surfaces of hollow truncated cones and the elastic ones being undulated and their arrangement being such that each of them connects the inner edge of one truncated cone with the outer edge of the next truncated cone, and so on. The truncated cones may stand upright or may be inverted, and their generatrix can be slightly curved. They are rigid and, therefore, able to overcome the forces arising from the gas pressure which act upon the elastic sheet metal rings and seek to arch them more strongly toward the outside and to bring their edges closer to each other. These forces are, therefore, equalized by the rigid conical sheet metal rings. The rigidness of said truncated cones entails, besides, a considerably greater stiffness of the entire gasholder.

If the gasholder is cylindrical in horizontal section, and if it is empty, the individual rigid shell members, or hollow truncated cones respectively, lie within one another, but are separated from one another by the undulated elastic shell members. In such a position the rigid truncated cones are and remain parallel to one another. If the gasholder is not cylindrical, but more or less conical, the position of the rigid cones relatively to one another is the same as in the first-mentioned case, but owing to the slope the higher conical shell members are located inside of the lower ones because they have a smaller diameter.

Figures 11, 11A:
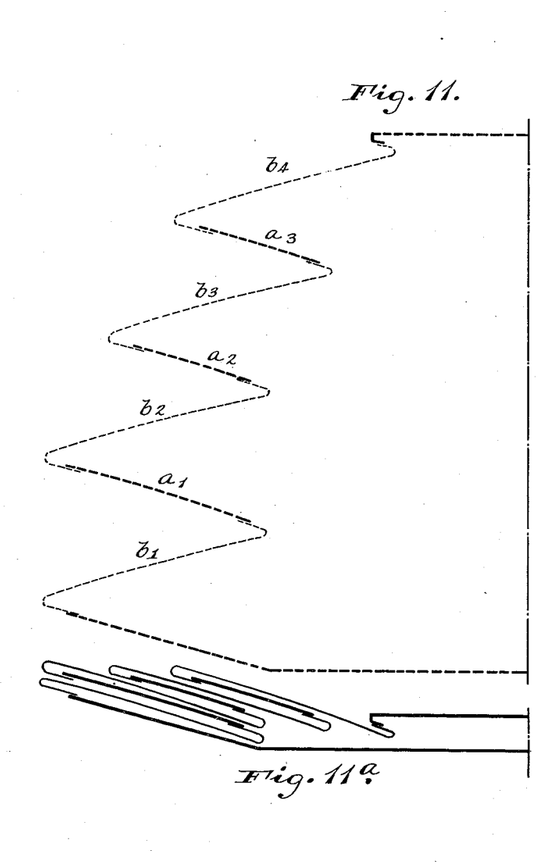
Figures 11 and 12 show two further modifications of the shell.

Two constructional forms of gasholder shells designed in the just mentioned manner are illustrated in the Figs. 11, 11a, 12 and 12a. The gasholder shown in Fig. 11 is cylindrical in its lower portion and conical in its upper portion. The upper hollow truncated cones $a1$, $a2$, $a3$ have a straight generatrix and are inverted. They are relatively rigid and are connected with one another by the undulated elastic shell members $b2$, $b3$, $b4$, each of which comprises two successive bends and an intermediate portion corresponding to the truncated cones $a1$, $a2$ and $a3$ and connects the inner edge of one of the truncated cones with the outer edge of an adjacent truncated cone. In Fig. 11 the expanded shell is shown partly in thin and partly in thick dotted lines, the thick ones indicating the hollow truncated cones and the thin ones indicating the elastic shell members. In Fig. 11a the same shell is shown in collapsed state, but in this figure the thin and the thick lines are full ones. It will be seen from this figure that the dead space is extraordinarily small wherein resides a very important advantage which this constructional form presents.

Figures 12, 12A:
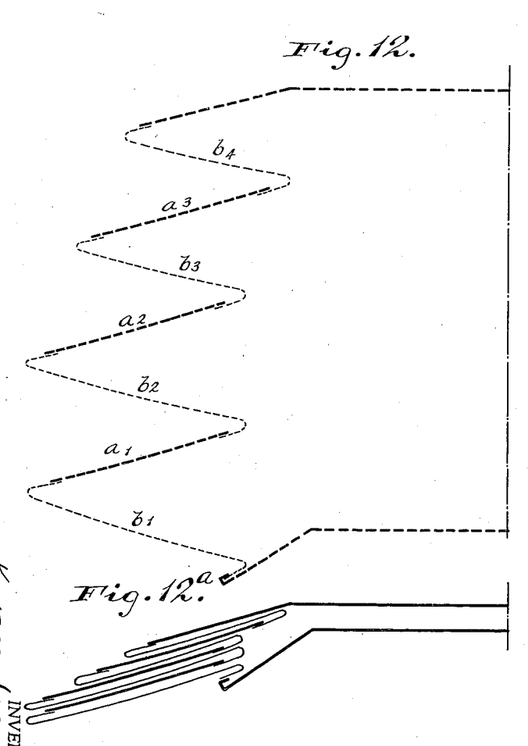
Figures 13, 14:
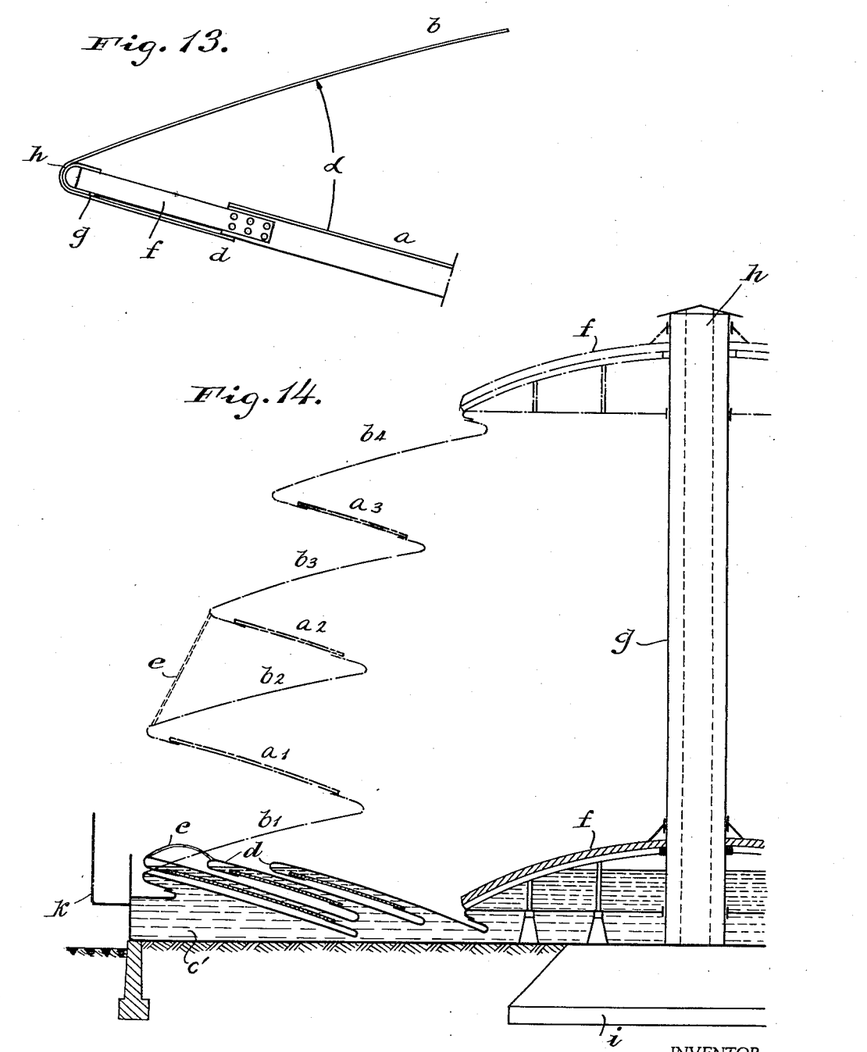
Figure 13 shows certain details drawn to an enlarged scale.
Figure 14 shows a modification in which a cleaning and heating device is provided for the undulated shell etc, all as fully described hereinafter.

In Figs. 12 and 12a the situation is practically the same, but the hollow truncated cones $a1$, $a2$, $a3$ are not inverted, and are very slightly vaulted or convex in upward direction, as appears from Fig. 13 whereby the further advantage is obtained that the bending moments originating from the gas pressure to which the truncated cones are subjected equalize those moments that arise from the transmission of the forces arising, in turn, in the elastic shell members $b1$, $b2$, $b3$ to the rigid truncated cones. Furthermore, the curvature of the latter yields the further advantage that they approach more closely the similarly curved elastic shell members (Fig. 12a). The shell members of Figs. 11 and 11a may be shaped in the same manner.

Owing to the employment of the relatively rigid shell members it is assured that the inner and the outer edges of the individual members move vertically. In order to render the taking up of the tensile forces, created by the gas pressure, by the elastic parts $b1$, $b2$, etc., of the shell as uniform as possible and, therefore, to keep the strains or stresses to which the material is subjected as low as possible, the rigid hollow truncated cones $a1$, $a2$, etc., are designed in the manner shown in Fig. 13. The truncated cones are rigid not along the entire length of the radius, but the rigid portion terminates somewhat remote from the innermost and the outermost diameter of the gasholder shell about at the point $d$ (Fig. 13), and from this point extend inwardly and outwardly bars $f$ provided at their free ends with suitable bent sheet-metal members $g$, the shape of which corresponds to the shape of the adjacent bent rim $h$ of the shell part $b$. The bars $f$ may likewise consist of sheet-metal, in which case they and the sheet-metal members may be made integral. The bent rims $h$ fit loosely and elastically around the members $g$. The connections at $d$ are gastight.

The particular advantage which this constructional form (Fig. 13) presents resides in the fact that the shell members $b$ become by far more elastic than if they are connected up at $h$, at their extreme end, directly to the truncated cones $a$, and this entails an advantage in that the working angle $\alpha$ between the surfaces $a$ and $b$ can be chosen larger than otherwise so that a smaller number of waves will do without any reduction of the capacity of the gasholder, and this means, in the end, a considerable increase of the economy in the erection of gasholders of my improved type.

In order to reduce the resistances which arise when the shell is lifted and lowered, still smaller undulations extending in radial direction may be provided in the elastic shell parts. Those undulations need not cover the entire area of the shell parts $b$; it is sufficient if they are arranged in the middle portion thereof.

When erecting gasholders of my improved type it is advisable to make first two superposed truncated cones, and then the upper one of these cones is lifted by as much as corresponds to half the expansion height of the elastic intermediate shell portion and this portion now is built in with a corresponding preliminary tension. The erection is then continued in this manner.

It will be noted that the vertical cross-sections of the gasholders shown in Figs. 11 and 12 (also in Fig. 14) are characterized by a wavy or sinuous form in which curved portions at the smaller and larger diameters are connected by relatively straight portions, the curved portions being flexible and expanding and contracting readily to take up stresses.

Concerning now the third portion of this invention, I first of all call attention to the fact that in gasholders corrosions are caused by the formation and accumulation of a mixture of water of condensation and of substances separating from the gas. It is very important for the proper, continually reliable operation of the gasholder, especially of those pertaining to the present invention, to render said corroding mixtures innoxious, and for this purpose the gasholder is provided at its bottom with an accumulation and cleaning or purifying basin, the contents of which can also be utilised for heating the gasholder.

I am aware that existing telescopic gasholders have a basin acting in a similar manner, but a continually satisfactory action of these basins is rendered impossible by reason of the fact that the water in the basin is soon saturated with the substances dissolved in it whereby the contents of the basin is soon rendered inactive. Renewing the contents of the basin is, with the telescopic gasholders, practically impossible, except when the gasholder is put out of service. This undesired requirement is obviated in my improved construction, in which the contents of the bottom basin can be renewed at any time without interfering with the service of the gasholder.

With gas holders having a central guide column it is suited to the purpose in view to heat also this column, in which case the heating device is so arranged that the heating of said column and of the cleaning or purifying liquid is effected by a common circulation of said liquid.

A constructional form of a thus further developed gasholder of my improved type is illustrated in Fig. 14 in which the gasholder is shown in the filled state, as well as in emptied state, the shell being drawn in dotted lines in the filled state of the gas holder, as well as in full lines in empty state of the gasholder. The shell is designed just so as in Figs. 11 and 11a, and, therefore, $a_1$, $a_2$, $a_3$ are inverted truncated hollow cones and $b_1$ to $b_4$ are undulated shell portions, all these members of the shell being received in a basin $c'$ when the gasholder is empty, and said portions are, therefore, collapsed, as shown in full lines. There are provided means (not shown) for supplying the basin with liquid and for withdrawing the liquid therefrom so that the contents of the basin can be renewed as often as desired in order to remove the water of condensation and the impurities. Preferably water or an oil or water with a layer of oil on its surface is used in the said basin, and it is also possible to add to the water etc. agents counteracting corrosions, as, for instance, sodium bichromate. Contrasted with telescopic gasholders, the outer surface of the gasholder never comes in contact with the liquid of the basin, so that the coating of the holder remains in its proper state.

When the collapsed shell parts become immersed in the liquid of the basin, there remain in the upper portions thereof gas residues which cannot escape and prevent said portions from being wetted by the liquid. In order to prevent this, flexible pipes $e$ may be attached to the places concerned, the gas otherwise enclosed and retained in a fold now being able to escape upwardly into the next fold above it, and so on, so that the liquid is able to penetrate practically to the uppermost surface of a fold or as high as the level of the body of liquid will permit.

Concerning the roof $f$, this can in its lowermost position dip completely into the basin liquid, but in this case a pipe (not shown) must extend upwardly from the top of the roof for the escape of the gas contained therebelow, but it is also possible to provide the roof with a heat-insulating covering preventing too strong cooling of the roof and thus a too strong condensation at the not immersed portion of the same. As insulating material preferably a layer of asphalt, concrete or tar-macadam is used whereby at the same time the expense for the otherwise necessary paint is saved.

In the example shown in Fig. 14, $g$ is the known central hollow column. Between this column and the central opening of the roof is any of the known packing means, for instance a stuffing box, a liquid-filled cup, a grease box, or the like. Fig. 14 shows a constructional form in which the gasholder is intended to be equipped with means (not shown) for heating it during frost, the arrangement being such that the basin, as well as said column, can be heated. I have abstained from showing details of the heating means, as I do not lay any claim thereto. The arrangement will include also circulation pipes which need not be illustrated.

The column may be provided with a central core $h$ of concrete or the like whereby the column is stiffened or reinforced and the amount of the heating liquid required for it is reduced. As the column must take up the wind pressure, it must have a sufficiently strong foundation, as shown at $i$. This foundation may be smaller if there is a concrete core within the column, but also the amount of water contained in the column and in the basin permits a reduction in the dimensions of said foundation.

In order to intercept the water of condensation flowing down at the outer surface of the gasholder shell, an annular channel $k$ may be provided from which the collected water can be withdrawn at any desired place. The outer wall of said channel may be so high that the collapsed shell disappears completely below the level of the liquid in the basin. As the contents of the basin and of the said channel remain always separated from one another, the chemicals added to the liquid in the basin and likely to damage the outer coating of the shell can never exert this detrimental effect.

The free portion of the column which projects over the roof is exposed to the weather. If the column is heated, a formation of ice on that end cannot take place, but if the column is not heated it is recommended to surround it with a telescopic protective shell which always covers just its free portion.

I claim:

1. A gasholder having a collapsible, accordion-like metallic shell formed of oppositely inclined sheet-metal ring sections joined at their outer and inner rims by flexible rounded metallic connections forming a continuation of said sections, at least certain of the ring sections being corrugated and capable of expansion and contraction by flattening and deepening, respectively, of the corrugations to relieve the stresses arising as the gasholder is being filled or discharged.

2. A gasholder having a collapsible, accordion-like metallic shell formed of oppositely inclined sheet-metal ring sections joined at their outer and inner rims by flexible rounded metallic connections forming a continuation of said sections, said shell being expansible and collapsible with change of shape of the sections to relieve the stresses arising therein, and flexible tension members connecting the outer edges of the superposed rings to each other, the length of said members being such that at the maximum permissible expansion of the gas holder, they hold the rings against further expansion and change of shape thereof.

3. A gasholder having an expansible and contractible accordion-like shell composed of interconnected superposed sheet metal rings, of which rings at least some consist of elastically flexible material and are curved to form a plurality of corrugations in the shell, whereby the contour of the gasholder varies during its normal operation to the extent that the said rings expand and contract under the influence of the stresses incident to the filling and discharging of the gasholder.

4. A gasholder according to claim 3, wherein the successive and alternate ridges and furrows of the corrugated sheet metal rings forming the gasholder shell follow each other in the upward direction.

5. A gasholder having an expansible and contractible accordion-like shell composed of interconnected superposed sheet metal rings, of which rings at least some consist of elastically flexible material and are each provided with corrugations whose successive and alternate ridges and furrows follow each other in the upward direction, whereby said rings are adapted to become broader during the filling of the gasholder and to become narrower during the emptying of the same, while the diameters of the outer and inner rims of the rings remain substantially constant during the upward and downward movement of the top of the gasholder.

6. A gasholder having an expansible and contractible accordion-like shell composed of interconnected superposed sheet metal rings, of which rings at least some consist of elastically flexible material and are each curved to form a plurality of corrugations, the successive and alternate ridges and furrows of the corrugated sheet metal rings forming the gasholder shell following each other throughout the circumferential extent of the gasholder shell, whereby the said rings are capable of ready change in length circumferentially of the gasholder.

7. A gasholder having an expansible and contractible accordion-like shell composed of interconnected superposed sheet metal rings, of which rings at least some consist of elastically flexible material and are curved to form a plurality of corrugations in the shell, whereby the contour of the gasholder varies during its normal operation to the extent that the said rings expand and contract under the influence of the stresses incident to the filling and discharging of the gasholder, and wherein the edges of the individual sheet metal rings at the corresponding one of the inner and outer diameters of such rings are connected by reinforcing members, whereby the diameters of the rings at the reinforced edges remain substantially constant and only the diameters of the rings at parts removed from the reinforced edges change during the movement of the shell.

8. A gasholder according to claim 3, wherein adjacent bands of the corrugations are connected with one another by expansion-limiting members in a manner to limit the lift of the rings.

9. A gasholder according to claim 3, including a guide frame extending downwardly from the roof of the gasholder and of such a length that its lower edge touches the ground when the gasholder is completely emptied.

10. A gasholder according to claim 3, wherein the diameter of the roof of the gasholder is smaller than that of the bottom, the shell decreasing in diameter in the upward direction.

11. A gasholder having an expansible and contractible accordion-like shell composed of interconnected and superposed sheet metal rings, said rings comprising relatively rigid rings alternating with elastically flexible rings, the vertical cross-section of each of the said flexible rings being a single wave, so that the vertical cross-section of the whole gasholder shell composed of relatively rigid sheet metal rings alternating with elastically flexible sheet metal rings is of sinuous form, whereby the contour of the gasholder varies during its normal operation to the extent that the said shell expands and contracts under the influence of the stresses incident to the filling and discharging of the gasholder.

12. A gasholder having an expansible and contractible accordion-like shell composed of interconnected superposed sheet metal rings, of which rings at least some consist of elastically flexible material and are curved to form a plurality of corrugations in the shell, whereby the contour of the gasholder varies during its normal operation to the extent that the said rings expand and contract under the influence of the stresses incident to the filling and discharging of the gasholder, and a liquid-containing basin at the bottom of the gasholder into which the rings of the shell are adapted to be received as the gasholder collapses, the height of the basin being such that it is able to receive the superposed sheet metal rings in the collapsed, empty condition of the gasholder in addition to the cover of the gasholder.

13. A gasholder according to claim 12, including a guiding column for the shell arranged at the center of the basin.

14. A gasholder according to claim 12, including a guiding column for the shell arranged at the center of the basin, and an annular trough surrounding the basin externally of the shell, the outer wall of the trough being higher than the outer wall of the basin so that the trough is adapted to receive condensate running down the sides of the shell.

15. A gasholder according to claim 3 wherein the ridges and furrows of the corrugations of the sheet metal rings forming the shell run concentrically with reference to the axis of the gasholder as the center and wherein the connections between the rings are of curved form so that a vertical section through the gasholder shell presents a sinuous outline.

16. A gasholder according to claim 3 wherein each of the sheet metal rings forming the shell consists only of a single wave and wherein the vertical cross-section of the gasholder shell consisting of the said rings each forming a single wave is of sinuous form, the said sheet metal rings being connected to each other through curved portions, whereby the rings are adapted to undergo a change in form in the direction of their breadth and to become broader on filling of the gasholder and narrower upon emptying of the same, while at the same time the diameters of the inner and outer rims of the sheet metal rings remain substantially constant.

17. A gasholder having a collapsible, accordion-like metallic shell formed of oppositely inclined sheet-metal ring sections joined by flexible rounded metallic connections forming relatively continuous extensions of at least certain of said sections, said shell being of sinuous form in vertical cross-section and being expansible and collapsible with change of its vertical outline to relieve the stresses arising threin as the gasholder is being filled or emptied.

18. A gasholder having a collapsible, accordion-like metallic shell formed of oppositely inclined sheet-metal ring sections joined by flexible metallic connections forming a continuation of at least certain of said sections, said shell being expansible and collapsible with change of its vertical outline to relieve the stresses arising therein, the outer bends of the shell being of decreasing diameter from the bottom toward the top of the gasholder and said sections lying in horizontally overlapping relation in the collapsed condition of the gasholder.

19. A gasholder having a collapsible, accordion-like metallic shell formed of oppositely inclined sheet-metal ring sections joined by flexible connections forming a continuation of at least certain of said sections, said shell being expansible and collapsible with change of its vertical outline to relieve the stresses arising therein, as the gasholder is being filled or emptied, the diameters of at least certain of the outer bands of the shell diminishing in the direction from the bottom to the top of the gasholder, said sections lying in horizontal overlapping relation in the collapsed condition of the gasholder.

20. A gasholder having a collapsible, accordion-like metallic shell formed of oppositely inclined sheet-metal ring sections joined by flexible connections forming an integral continuation of at least certain of said sections, said shell being expansible and collapsible with change of its vertical outline to relieve the stresses arising therein as the gasholder is being filled or emptied, said gasholder including a bottom and a top plate, the uppermost section being attached to the top plate inwardly of the line of attachment of the lowermost section to the bottom, at least certain of said sections in the collapsed condition of the gasholder lying in horizontally overlapping relation between the lines of attachment of the shell to the bottom and top plates.

21. A gas holder having a collapsible accordion-like metallic shell formed of oppositely inclined sheet-metal ring sections joined at their outer and inner rims by flexible connections forming a continuation of at least certain of said sections, said shell being expansible and collapsible with change of its vertical outline to relieve the stresses arising therein as the gas holder is being filled or emptied, said gasholder including a bottom and a top plate, the line of attachment of the uppermost section to the top plate and the line of attachment of the lowermost section to the bottom plate being out of vertical alignment, at least certain of said sections in the collapsed condition of the gasholder lying in horizontally overlapping relation between said lines of attachment.

22. A gasholder having a collapsible, accordion-like shell formed at least in part of oppositely inclined sheet-metal rings, at least certain of said rings being of decreasing diameter in the vertical direction, so that in the collapsed condition of the gasholder they have their corresponding diameters horizontally displaced with reference to each other, a liquid-containing trough for receiving the rings in the collapsed condition of the gasholder, and flexible tubular connections between portions of the rings lying uppermost in the collapsed condition of the rings to enable gas trapped between successive rings to escape and thus permit the rings to sink into the trough.

23. A gasholder having an expansible and contractible accordion-like shell composed of interconnected and superposed sheet metal rings, relatively rigid rings alternating with elastically flexible rings, the vertical cross-section of each of the said flexible rings being a single wave, so that the vertical cross-section of the gasholder shell composed of the relatively rigid sheet metal rings alternating with elastically flexible sheet metal rings is of sinuous form, the ridges and furrows extending concentrically to the center of the gasholder, whereby the contour of the gasholder is variable during the movements of the shell to such an extent that the rings are able to expand or contract under the influence of the tensile or compressive stresses existing during the filling or discharging of the gasholder, and the rings being so dimensioned and related that the shape of the rigid rings in the expanded condition of the shell corresponds to the lateral surface of a truncated hollow cone, the adjacent rings being of opposite inclination in the expanded condition of the gasholder.

24. A gasholder having an expansible and contractible accordion-like shell composed of interconnected and superposed sheet metal rings, said rings comprising relatively rigid rings alternating with elastically flexible rings, the vertical cross-section of each of the said flexible rings being a single wave, so that the vertical cross-section of the whole gasholder shell composed of relatively rigid sheet metal rings alternating with elastically flexible sheet metal rings is of sinuous form, the ridges and furrows extending concentrically to the center of the gasholder, whereby the contour of the gasholder is variable during the movements of the shell to such an extent that the rings are able to expand or contract under the influence of the tensile or compressive stresses existing during the filling or discharging of the gasholder, the rings being dimensioned and related so that in the expanded condition of the gasholder the relatively rigid rings assume the shape of the wall of a truncated hollow cone, at least certain of said rigid rings being provided at their edges with forwardly extending bars, and rounded sheet metal members supported at the free end of said bars, the adjoining elastically flexible sheet metal rings having corresponding marginal zones bent about said members and secured to the edges of the rigid rings at a distance from the rounded members determined by the said bars.

KONRAD JAGSCHITZ.